United States Patent Office 3,689,218
Patented Sept. 5, 1972

3,689,218
PRODUCTION OF ACTIVE MAGNESIA
James Kelly Hodges, St. Louis, Mich., assignor to Michigan Chemical Corporation, St. Louis, Mich.
No Drawing. Filed July 24, 1970, Ser. No. 58,168
Int. Cl. C01f 5/22
U.S. Cl. 423—155                                           6 Claims

ABSTRACT OF THE DISCLOSURE

A process is disclosed for treating inland brines or other suitable sources of magnesia with an alkali metal hydroxide, such as sodium hydroxide, prior to calcining for increasing the iodine number; that is, increasing the surface area and therefore the activity; and for providing a more uniform iodine number from batch to batch.

---

The present invention relates to an improved process for producing magnesium oxide having increased and more uniform activity as compared with similar products produced by known processes.

Many processes have been suggested heretofore for producing magnesium hydroxide or magnesia from aqueous brines. Such brines not only contain soluble magnesium compounds, usually magnesium chloride, but also as a rule calcium chloride and lesser amounts of various cations and anions such as potassium, strontium, boron, iron, bromine, iodine, sulfate and others—some in very small amounts but often in undesirable amounts nevertheless. The brines utilized as starting materials for processes of this character have varied considerably. For example, sea water has been used as have bitterns resulting from the evaporation of sea water, and magnesium-containing brines which are by-products of various industrial processes. The so-called inland brines obtained from brine wells are relatively concentrated as compared with sea water and have been a productive source of magnesia.

One preferred method for recovering magnesium products from brines containing them has involved the use of dolomite stone. Dolomite is a substantially equimolar mixture of magnesium carbonate and calcium carbonate. Thus the magnesium values contained in the dolomite can be recovered additionally to those in the brine resulting in an increase in the yield of the magnesia produced. In one conventional method of producing magnesium hydroxide slurries from dolomite and magnesium-containing brines, the dolomite is first crushed to calcinable pieces and is then calcined in a kiln at about 1300° C. As a result of this calcining operation, the magnesium and calcium carbonate are converted to the corresponding oxides by driving off carbon dioxide. This calcined dolomite is sometimes referred to as "dolime." The dolime thus calcined is then slaked; that is, it is treated with water or an aqueous solution such as an aqueous calcium chloride solution or brine to convert the calcium oxide of the dolime to the hydroxide. This slaking operation may be carried out for example at a temperature of about 70° C. to about 100° C. for a time approximating 30 minutes. Most processes of this character slake some but not all of the magnesium oxide in the dolime so that the slaked dolime consists of calcium hydroxide, some magnesium hydroxide and some magnesium oxide. The slaked dolime is then reacted with the magnesium chloride-containing brine to precipitate the magnesium contained in the brine as magnesium hydroxide, the calcium chloride being maintained in solution in the aqueous mother liquor. The precipitate is comprised of magnesium hydroxide and slaked magnesium oxide for the most part, and is separated from the mother liquor by suitable means such as filtration. The precipitate is often referred to as "mud," and contains small amounts of various substances as impurities. The mother liquor is normally discarded after the separation mentioned. It may be used to recover calcium chloride, but it is no longer useful in the process for the recovery of magnesium hydroxide or magnesia.

Washing and filtering of the magnesium hydroxide-magnesia mixture with water follows in order to remove, insofar as possible, the calcium chloride, sodium chloride and other soluble impurities. The resulting solids are then held in a holding tank as a rule so that the precipitate may settle and the supernatant liquid be removed. In this connection it is often a problem to obtain effective settling of the magnesium hydroxide-magnesium oxide mixture inasmuch as there is a tendency to produce a precipitate in the form of small particles which stay in suspension. Also, it is usually desirable to obtain a "dense" slurry; that is, one having a relatively high magnesium hydroxide content in suspension. However this is not easily accomplished. Even if the slurry is dried at this point in the process, the magnesium hydroxide tends to be fluffy; that is, it has a low apparent density. Some processes go so far as to form small briquettes or shaped particles of some kind for feeding a kiln in order to avoid dust losses and to improve the properties of the calcined product.

There are various processing steps and types of equipment which may be used to remove the water in the slurry, if wet slurry is used as the feed, as well as the chemically bound water of the magnesium hydroxide. Usually a direct fired rotary kiln is used. But a calciner; that is, a furnace which is indirectly fired (the slurry is not contacted by the flame or products of combustion) may be employed, as may specially designed equipment such as vertical kilns. Magnesium hydroxide whether or not in the form of pellets or whether wet or dry when introduced into a kiln or the like if treated at temperatures above approximately 900° C. will be substantially inactive chemically. At 1600° C. or higher the material often referred to as "dead-burned," becomes crystalline in structure, quite refractory in nature, and of course inactive chemically. On the other hand the feed material should be treated at 350° C. or higher in order to produce appreciable disassociation or loss of the chemically bound water. Thus, the time-temperature treatment must be carefully controlled in order to produce a magnesia having the desired chemical activity, assuming of course that active magnesia is desired, while achieving removal of the water at a practicable rate.

The chemical activity of the magnesia has, through the experience of a number of prior workers, been associated with the surface area—the larger the surface area, the greater the activity. The surface area may be measured scientifically by the adsorption of various gases such as nitrogen under very carefully controlled conditions. But the so-called iodine number has served as a more practicable test, and is a widely used measure of surface area and thus of activity. The iodine number depends upon the adsorption of a mono-molecular layer of iodine onto the surface of the magnesia from a suitable solution of iodine, such as a carbon tetrachloride solution of known iodine concentration. The amount of adsorbed iodine is then determined by measuring the amount of iodine lost from the known iodine solution using conventional analytical procedures. Application of the appropriate equations results in an iodine number which if multiplied by a factor of 0.95 provides the actual surface area of the magnesia in square meters per gram. Since this factor 0.95 is by coincidence nearly 1, for many purposes the iodine number is said to provide the surface area in square meters per gram—see Zettlemoyer, A. C., and Walker, W. C., Ind. Eng. Chem. 39 (1947) page 72, et seq.

In order to obtain magnesia having a relatively high iodine number, it has been considered necessary heretofore to heat the magnesium hydroxide at temperatures of about 350° to 450° C. Dehydration is too slow to be practical at lower temperatures and if much higher temperatures were used in order to obtain more rapid dehydration, the iodine numbers became erratic. As the temperature approaches 900° C., there is a strong tendency to produce magnesia having lower iodine numbers, although on occasion a single batch had a higher iodine number for reasons which were not understood. Active magnesia is usually produced in the form of a powder of small particle size, and has no well defined crystal structure, as contrasted with dead-burned magnesia which is crystalline. In fact active magnesia is usually amorphous, has a large surface area, and has a relatively high degree of activity. It is used, among other things, as an adsorbant for treating fatty acids and petroleum products, and for removing impurities from various products such as lubricants. It has also been used as a dehydrating agent, for treating ethyl alcohol for instance, and as a catalyst for various reactions such as synthetic rubber. In fact it has a comparatively wide variety of uses mostly as a catalyst or as an adsorbant in various chemical industries. Dead-burned magnesia is of course used for entirely different purposes—for making refractory brick for example.

In spite of extensive efforts to control the process for producing them, the activity of active magnesias have varied in a most non-uniform manner heretofore, both as to activity from particle to particle, activity from the outside surface to the center of the particle, and of course from batch to batch. Thus the production of active magnesia is having the desired properties is not a simple matter of precipitating magnesium hydroxide by means of a suitable calcium compound, filtering off the mother liquor, and calcining the magnesium hydroxide to drive off the water. Many factors importantly influence the activity and other properties of the magnesia obtained, often undesirably, and are difficult to control. For example, the source of the magnesia, the method used to recover it from the brine, the amount of water in the slurry fed to the kiln, the type of kiln or calcining equipment utilized, the pH of the slurry, and many others could be mentioned in this connection.

It has been discovered in connection with the present invention that the presence of a mud of certain halide ions especially chlorine or bromine ions together with certain cations especially magnesium or calcium ions, produce lower iodine numbers and thus indicate a lower activity of the calcined magnesia. It has also been discovered that the treatment of the magnesium hydroxide slurry or mud with an alkali metal hydroxide prior to the calcining operation increases the iodine number even if added in small quantities, and made a much more uniform iodine number possible from batch to batch. Sodium or potassium hydroxide are certainly preferred as the alkali metal hydroxide. However, the other alkali metal hydroxides namely lithium or cesium hydroxide might be used theoretically but of course they are impracticable from the commercial point of view. It had been suspected by prior workers that impurities, generally speaking, caused lower iodine numbers and that such impurities should be washed free from the magnesium hydroxide or carbonate prior to the calcining—see Zettlemoyer et al. cited hereinbefore. But such washing operations could only reduce the chloride content to about 1% and at the very best to about 0.4%. It was thought that further purification was not feasible—see U.S. 2,606,816. Thus, it was not appreciated previously that the presence of the halide ions mentioned above together with magnesium or calcium ions provided a source of difficulty, and it was surely not suggested that the addition of sodium hydroxide or some other alkali metal hydroxide would overcome this difficulty.

Although the sodium, potassium or other alkali hydroxide may be added to the magnesium-containing slurry or feed at any suitable point depending upon the process and equipment utilized, it is suggested in case a conventional rotary kiln is used, that two desirable points suggest themselves. First the magnesium hydroxide or other magnesium compounds utilized are normally produced in the form of a slurry or "mud" from a settling tank or the like. It is almost always necessary to thicken this slurry in some manner as by a filtering operation to produce either a cake or a thickened pumpable slurry which is fed to the kiln. It is suggested therefore that the sodium or other hydroxide could be in the form of an aqueous solution, metered at the desired rate of addition, and added in the line conveying the magnesium-containing slurry as it enters the filtering apparatus. By this means, excess sodium or other hydroxide would be removed during the filtration and nothing would be changed in the process. It could be conducted from that point onward in the normal way. The filter cake or thickened slurry would be at the normal level and the only difference would be a slightly increased sodium content in the mud. However this procedure would result in some loss of sodium hydroxide as it would not normally be feasible to recover it. This loss would not be significant for a low volume operation, but it could become more important in the high volume operation particularly with respect to feed intended for a kiln as contrasted with an indirectly heated calciner or the like. Furthermore, the volume of the feed intended for the kiln is normally pumped into a surge tank, or into some kind of a storage tank resulting in a time lag between the sodium hydroxide addition and the filtering operation, and the calcining.

Accordingly, it might be preferable, depending upon the circumstances and the process utilized, to add the sodium hydroxide directly to the feed for the kiln at some point immediately prior to introduction of the feed into the kiln. This would, of course, eliminate or substantially reduce the problem of the time lag particularly during product changeovers. Also no sodium hydroxide would be lost or very little would be lost; and it is possible that a smaller quantity of sodium hydroxide would be necessary since at least some of the calcium chloride would have been removed during the filtering operation. However this procedure would require that the sodium hydroxide be adequately dispersed in the magnesium-containing mud prior to its entering the kiln, and this could present problems. If the mud were dried prior to calcining or shaped particles or pellets were used, solid sodium hydroxide could be added at this point.

The extent of addition of the alkali metal hydroxide, of course, depends on the amounts of impurities present. It has been found that additions of the hydroxide in the range of 0.5 to 4.5 moles per one mole of halide impurities have been satisfactory. For example if chloride ions were the impurity then sodium hydroxide additions would be in the range of 0.5 to 4.5 moles per one mole of chloride ions. Another way of determining the extent of addition of alkali metal hydroxide is the amount of magnesium present in the slurry or feed. For example, sodium hydroxide can be added in the range of .70 to 2.0 wt. percent of MgO present. The MgO is determined by calcining a weighed representative sample of the slurry.

The range 0.5 to 4.5 moles of alkali metal hydroxide addition to one mole of halide ions may appear unduly broad. This is not so because the range of impurities vary considerably. Also the above-mentioned range depends on the type of slurry or feed being treated.

The examples below serve to illustrate the operation and utility of the present invention, but are not to be construed in any way as limiting the invention thereto.

EXAMPLE I

To investigate the adverse effects of halide ions and/or alkaline earths including magnesium on the activity of magnesia formed from magnesium hydroxide a number of experiments was conducted on a flowable slurry of magnesium hydroxide prepared as follows:

Reagent grade magnesium carbonate was dissolved in nearly stoichiometric amount of reagent grade nitric acid. The pH of the solution is adjusted to about 5. The solid content of the magnesium nitrate was adjusted to 20 g. of MgO per liter. To form the magnesium hydroxide reagent grade sodium hydroxide solution having 20 g./l. NaOH was added simultaneously with the magnesium nitrate solution into a reaction vessel. The rates of addition were 24 ml./min. NaOH to 12 ml./min. $Mg(NO_3)_2$.

The magnesium hydroxide solids were allowed to settle out and the supernatant solution was drawn off. The solids were then washed with deionized water several times. The hydroxide was then filtered off with vacuum and washed again with water. The hydroxide was then re-dispersed in an amount of water to maintain a flowable slurry having magnesium oxide content of about 45 g. per liter. Three 25 ml. portions of the above magnesium hydroxide slurry were filtered separately and the magnesium hydroxide was individually transferred to a porcelain crucible and fired at 600° C. for 30 minutes. The resulting oxide was cooled in a desiccator for 15 minutes and was then ground for 3 minutes. The activity of the magnesium oxide (magnesia) was then measured by determining the iodine number. The average iodine number for the three runs was 141 utilizing 1.0000 gram in each case. It should be understood that such a level of activity is rather high and may not be producible in plant operations. Similarly, the activity so determined may be higher under more controlled conditions.

The effect of $MgCl_2$ on the activity of MgO was determined by mixing 25 mls. of 0.472 M $MgCl_2$ with 25 mls. of the $Mg(OH)_2$ slurry described above. The magnesium hydroxide was filtered out and washed with the 0.472 M $MgCl_2$ solution until saturation. The magnesium hydroxide was then sucked dry with the aid of vacuum. It was then fired at 600° C. for 30 minutes, cooled in a desiccator for 15 minutes and ground for 3 minutes. The iodine number on 1.0000 g. sample was determined to be 22.

The following Table I shows the drop of the activity of magnesia, as determined by iodine number, in the presence of magnesium chloride. The starting material was the $Mg(OH)_2$ slurry described above; all samples being fired at 600° C. for 30 minutes, cooled in a desiccator for 15 minutes and ground for 3 minutes.

TABLE I.—EFFECT OF VARIOUS CONCENTRATIONS OF $MgCl_2$ ON ACTIVITY OF MAGNESIA

| Starting material | $Mg^{++}$ (M) | $Cl^-$ (M) | Iodine Number |
|---|---|---|---|
| $Mg(OH)_2$ | 0 | 0 | 141 |
| $Mg(OH)_2$ | .472 | .945 | 22 |
| $Mg(OH)_2$ | .236 | .472 | 24 |
| $Mg(OH)_2$ | .118 | .236 | 27 |
| $Mg(OH)_2$ | .059 | .118 | 25 |
| $Mg(OH)_2$ | .0295 | .059 | 30 |
| $Mg(OH)_2$ | .0148 | .0295 | 76 |
| $Mg(OH)_2$ | .00985 | .0197 | 96 |
| $Mg(OH)_2$ | .00738 | .0148 | 96 |
| $Mg(OH)_2$ | .00493 | .00985 | 113 |
| $Mg(OH)_2$ | .00369 | .00738 | 117 |
| $Mg(OH)_2$ | .00185 | .00369 | 132 |
| $Mg(OH)_2$ | .00093 | .00185 | 137 |

EXAMPLE II

A series similar to that described in Example I was conducted but using $MgBr_2$ as the impurity. Again a comparable stock solution of $Mg(OH)_2$ was prepared. Table II below gives the drop of the iodine number of the magnesia resulting from the magnesium hydroxide in the presence of $MgBr_2$.

TABLE II.—EFFECT OF VARIOUS CONCENTRATIONS OF $MgBr_2$ ON ACTIVITY OF MAGNESIA

| Starting material | $Mg^{++}$(M) | $Br^-$(M) | Iodine number |
|---|---|---|---|
| $Mg(OH)_2$ | 0 | 0 | 142 |
| $Mg(OH)_2$ | .24 | .48 | 34 |
| $Mg(OH)_2$ | .12 | .24 | 45 |
| $Mg(OH)_2$ | .06 | .12 | 37 |
| $Mg(OH)_2$ | .03 | .06 | 43 |
| $Mg(OH)_2$ | .015 | .03 | 64 |
| $Mg(OH)_2$ | .0075 | .015 | 116 |
| $Mg(OH)_2$ | .00375 | .00188 | 138 |

Examples I and II have clearly demonstrated the adverse effects of chlorides and bromides on the activity of magnesia in the presence of magnesium ions. More dramatic than above was the effects shown by the addition of calcium chloride.

EXAMPLE III

A series similar to those described in Example I and Example II was conducted but utilizing calcium chloride as the impurity. Table III below shows the drop of the magnesia activity as measured by the iodine number.

TABLE III.—EFFECT OF VARIOUS CONCENTRATIONS OF $CaCl_2$ ON ACTIVITY OF MAGNESIA

| Starting material | $Ca^{++}$(M) | $Cl^-$(M) | Iodine number |
|---|---|---|---|
| $Mg(OH)_2$ | 0 | 0 | 138 |
| $Mg(OH)_2$ | 0.500 | 1.00 | 14 |
| $Mg(OH)_2$ | 0.125 | 0.25 | 26 |
| $Mg(OH)_2$ | 0.0313 | 0.0625 | 39 |
| $Mg(OH)_2$ | 0.0078 | 0.0156 | 94 |
| $Mg(OH)_2$ | 0.00195 | 0.0039 | 126 |

EXAMPLE IV

The effect of chloride ions on the activity of magnesia was demonstrated by use of sodium chloride solutions. Again $Mg(OH)_2$ slurry prepared similarly to that described in Example I was used. The slurry was mixed with the NaCl solution and then filtered. The solids were washed with the sodium chloride solution until saturation. The solids were then fired at 600° C. as described in Example I. Table IV provides the effects of $Cl^-$ concentrations on the activity of MgO.

TABLE IV.—EFFECT OF $Cl^-$ ON ACTIVITY OF MgO

| Starting material | $Cl^-$(M) | Iodine number |
|---|---|---|
| $Mg(OH)_2$ | 0 | 138 |
| $Mg(OH)_2$ | .5 | 52 |
| $Mg(OH)_2$ | .25 | 62 |
| $Mg(OH)_2$ | .10 | 78 |
| $Mg(OH)_2$ | .025 | 102 |
| $Mg(OH)_2$ | .005 | 137 |

It appears that the decrease in iodine number is worst in the presence of calcium ions. While the presence of sodium and potassium may be adverse at very high concentrations, the beneficial aspects, at lower concentrations, in enhancing the activity of magnesia, as measured by the iodine number, are demonstrated by the following examples.

EXAMPLE V

A large sample of magnesium hydroxide "mud" was obtained from plant operation for processing inland brines. Analysis of the "mud" showed it to contain 25.7% by weight MgO. The mud was diluted with sufficient amount of deionized water to provide a slurry containing 50 g. of MgO per liter. Two 25 ml. portions of the slurry were measured and placed into separate crucibles. To one crucible was added about 3 ml. portion of 0.5 N NaOH. Both crucibles were then placed in a furnace and fired at 600° C. for 80 minutes (precautions were taken to prevent boiling over or spillage). After cooling the activity of the magnesia obtained in each crucible was measured. The sample treated with NaOH gave an iodine number of 53 whereas the untreated sample gave an iodine number of 25. It is obvious that the NaOH treatment provided a real surprising enhancement of the activity of magnesia.

EXAMPLE VI

From the same plant "mud" described in Example V, two 25 ml. samples were measured out and placed into two separate crucibles without dilution. To one crucible was added about 3 mls. of 0.5 N NaOH and nothing to the other. The two crucibles were then placed to dry in a 125° C. oven for a few hours after which they were fired at 600° C. for 30 minutes. After cooling the activity of both magnesias was measured. The one treated with NaOH had an iodine number of 75 whereas the untreated sample had an iodine number of 45.

EXAMPLE VII

A large sample of "Calciner Feed" was obtained from plant operation. "Calciner Feed" refers to a "carbonated" mud, in that it contains magnesium carbonates in addition to magnesium hydroxide. Generally, magnesias obtained from "Calciner Feed" have higher activities than those obtained from "Kiln Feed," that is, magnesium hydroxide mud. A series of experiments was conducted on "Calciner Feed" showing that the magnesias resulting therefrom had an average iodine number of 66. When same material was treated with sodium hydroxide, the average iodine number was 94.

It is surprising that the treatment of the magnesium hydroxide slurry or magnesium carbonate feed with sodium hydroxide would have such a noticeable effect in increasing the iodine number. In the first place, the halide which is believed to be the source of the difficulty is still present, and in the second place sodium, as a cation, would be expected to have as bad an effect as magnesium or calcium. The reasons for the improvement in the iodine number or the activity of the resulting magnesia are not fully understood.

However, it can be hypothesized that the growth of magnesium oxide crystals or crystallites results from the presence of hydrogen chloride within the magnesium hydroxide matrix during ignition. These crystallites appear to cross-link and grow in size in much the same way as they would if the magnesia were being ignited at a much higher temperature. In the past it has been considered impossible for such crystal growth to occur at these relatively low temperatures but it would appear that they do so at temperatures below 900° C. and in fact appear to do so at temperatures of 400–700° C.

It is suggested that sodium hydroxide when present within the magnesia system during the ignition tends to remove the hydrogen chloride, thus preventing or inhibiting the reaction between hydrogen chloride and magnesium hydroxide. The result of this shift in equilibrium is that less hydrogen chloride is involved in the crystallites growth so that the magnesia so produced has a higher activity as measured by the high iodine number. This belief was supported by the detection of sodium chloride in the feed resulting from the sodium hydroxide treatment of the magnesium hydroxide slurry. If sodium chloride is indeed being formed, additional sodium hydroxide when added to the system should cause still more hydrogen chloride to be removed and should result in the production of a still more active magnesia. Experiments have demonstrated that this effect does indeed occur. Furthermore, the introduction of sodium hydroxide into a magnesium hydroxide sample containing calcium chloride should result in an ignition reaction similar to that encountered when sodium chloride appears as an impurity. In other words the activity and consequently the iodine number of the resulting magnesia should be increased under these conditions. Experimental results have shown that this result does occur.

What is claimed is:

1. A process for obtaining improved active magnesia from a slurry containing magnesium hydroxide as well as magnesium or other alkaline earth halides, which comprises mixing with said slurry 0.5–4.5 moles of sodium or potassium hydroxide per mole of said halides, and thereafter calcining the slurry so treated while it contains said hydroxide at a temperature of from 400° C. to 900° C., said improved magnesia being characterized in that it possesses an enhanced or more reproducible level of activity as compared with the activity of magnesia obtained from said slurry without said treatment.

2. A process for obtaining improved active magnesia according to claim 1 wherein the magnesium or other alkaline earth halides include calcium or magnesium chloride, or calcium or magnesium bromide.

3. A process for obtaining improved active magnesia according to claim 1 wherein the slurry is obtained by mixing a brine containing at least one magnesium halide with slaked calcined dolomite.

4. A process for obtaining improved active magnesia according to claim 3 wherein the sodium or potassium hydroxide is introduced into the slurry immediately prior to the calcining operation in the form of an aqueous solution.

5. A process for obtaining improved active magnesia from a slurry containing magnesium carbonate or basic magnesium carbonate as well as magnesium or other alkaline earth halides, which comprise mixing with said slurry 0.5–4.5 moles of sodium or potassium hydroxide per mole of said halides, and thereafter calcining the slurry so treated while it contains said hydroxide at a temperature of from 400° C. to 900° C., said improved magnesia being characterized in that it possesses an enhanced or more reproducible level of activity as compared with the activity of magnesia obtained from said slurry without said treatment.

6. A process for obtaining improved active magnesia according to claim 5 wherein the slurry contains magnesium hydroxide as well as magnesium carbonate or basic magnesium carbonate.

References Cited

UNITED STATES PATENTS

| 3,525,588 | 8/1970 | Hwang | 23—201 |
| 2,641,531 | 6/1953 | Austin et al. | 23—201 |
| 1,231,423 | 6/1917 | S. Peacock | 23—201 |

FOREIGN PATENTS

| 861,931 | 3/1961 | Great Britain | 23—201 |

EDWARD J. MEROS, Primary Examiner

G. ALVARO, Assistant Examiner

U.S. Cl. X.R.

423—636